US009535949B2

(12) United States Patent
Beilmann et al.

(10) Patent No.: US 9,535,949 B2
(45) Date of Patent: Jan. 3, 2017

(54) DYNAMIC RULES TO OPTIMIZE COMMON INFORMATION MODEL QUERIES

(71) Applicant: International Business Machines Corporation, Armonk, NY (US)

(72) Inventors: Arnold Beilmann, Heidelberg (DE); Thomas H. Gnech, Herrenberg (DE); Eric R. Kass, Mannheim (DE); Steffen Koenig, Heidelberg (DE); Oliver Petrik, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 14/228,336

(22) Filed: Mar. 28, 2014

(65) Prior Publication Data
US 2015/0278303 A1    Oct. 1, 2015

(51) Int. Cl.
G06F 17/30    (2006.01)

(52) U.S. Cl.
CPC ... G06F 17/30442 (2013.01); G06F 17/30327 (2013.01); G06F 17/30463 (2013.01)

(58) Field of Classification Search
CPC .............. G06F 17/30864; G06F 17/30442; G06F 17/30463
See application file for complete search history.

(56) References Cited

U.S. PATENT DOCUMENTS

| 6,862,736 | B2 | 3/2005 | Hudis et al. |
| 7,761,493 | B1 | 7/2010 | Markel et al. |
| 8,176,102 | B2 | 5/2012 | Pankaj et al. |
| 8,285,711 | B2 | 10/2012 | Bordawekar et al. |
| 2005/0193109 | A1* | 9/2005 | Hudis ............... G06F 17/30557 709/223 |
| 2007/0185845 | A1 | 8/2007 | Nonomura |
| 2008/0005305 | A1 | 1/2008 | Hass et al. |
| 2009/0043745 | A1* | 2/2009 | Barsness .......... G06F 17/30471 |
| 2010/0030896 | A1* | 2/2010 | Chandramouli .. G06F 17/30516 709/224 |

OTHER PUBLICATIONS

"Continuous Cloud-Scale Query Optimization and processing", Nicolas et al. copyright 2013, Proceedings of the LDB Endowment, vol. 6, No. 11.*
Janssen, Redelf, "CIM & CEA im z/OS Unfeld", z/OS Guide Lahnstein / Oct. 12, 2012, provided by inventors in Post Disclosure on Nov. 21, 2013, retrieved on Jan. 30, 2014, © 2012 IBM Corporation, pp. 1-29, <http://guide.krzn.de/G102_Oct12/%2315%23_CIM_CEA.pdf>.

(Continued)

*Primary Examiner* — Apu Mofiz
*Assistant Examiner* — Cindy Nguyen
(74) *Attorney, Agent, or Firm* — Isaac J. Gooshaw

(57) ABSTRACT

One or more processors apply rules to a first query to generate a modified query such that processing of the modified query is improved for a first set of processing conditions. One or more processors measure a degree of latency experienced during processing of the modified query under a second set of processing conditions. One or more processors generate other rules to be applied to queries based, at least in part, on the measured degree of latency.

10 Claims, 5 Drawing Sheets

(56) References Cited

OTHER PUBLICATIONS

Karayannidis et al., "Processing Star Queries on Heirarchically-Clustered Fact Tables", Proceedings of the 28th VLDB Conference, Hong Kong, China, 2002.
Distributed Management Task Force, Inc., "Job Control Profile", Document No. DSP1103, Date: May 11, 2012, Version: 1.0.0, pp. 1-21, provided by inventors in Post Disclosure on Nov. 21, 2013, retrieved on Jan. 30, 2014, Copyright © 2012, DMTF, All rights reserved, <http://www.dmtf.org/sites/default/files/standardsi/documents/DSP1103_1.0.0_0.pdf>.
Distributed Management Task Force, Inc., "CIM, Common Information Model", Standards & Technology, provided by inventors in Post Disclosure on Nov. 21, 2013, retrieved on Jan. 30, 2014, Copyright © 2012, DMTF, All rights reserved, pp. 1-7, <http://www.dmtf.org/standards/cim>.
IBM, "Method and Apparatus for building Intuitive CIM Clients that defines Procedural Query Language for efficiently modeling CIM Queries", An IP.com Prior Art Database Technical Disclosure, Authors et al.: IBM, Original Publication Date: Nov. 25, 2008, IP.com No. IPCOM000176852D, IP.com Electronic Publication: Nov. 25, 2008, pp. 1-7.
IBM, "Apparatus, System, and Methods for self-optimized CIM data collection algorithm selection", An IP.com Prior Art Database Technical Disclosure, Authors et. al.: IBM, Original Publication Date: Dec. 10, 2008, IP.com No. IPCOM000177367D, IP.com Electronic Publication: Dec. 10, 2008, pp. 1-8.
U.S. Appl. No. 14/307,772, entitled "Dynamic Rules to Optimize Common Information Model Queries" filed Jun. 18, 2014.

\* cited by examiner

DYNAMIC RULES TO OPTIMIZE COMMON INFORMATION MODEL QUERIES

BACKGROUND OF THE INVENTION

The present invention relates generally to the field of Common Information Model (CIM) systems, and more particularly to optimizing CIM query processing.

CIM is an open standard that defines how managed elements in an IT environment are represented as a common set of objects and relationships between them. This is intended to allow consistent management of these managed elements, independent of their manufacturer or provider. CIM allows multiple parties to exchange management information about managed elements and also allows those parties to actively control and manage those elements. By using a common model of information, management software can be written once and work with many implementations of the common model without complex and costly conversion operations or loss of information.

There are a large number of CIM implementations on different computing platforms that vary in data access and retrieval performance. Often, there is more than one CIM query or set of queries available to retrieve a certain set of CIM data. The performance of those queries is often implementation dependent. For example, a CIM query used to retrieve a certain CIM object on one computing platform (e.g. System p) may be less efficient when used for another platform (e.g. System z). Furthermore, the CIM query performance is dependent on the number of CIM objects and access paths between those objects in the Common Information Model Object Manager (CIMOM).

SUMMARY

Embodiments of the present invention provide a method, system, and program product for applying rules to queries. One or more processors apply one or more first rules to a first query to generate a modified query such that processing of the modified query is improved for a first set of processing conditions. One or more processors measure a degree of latency experienced during processing of the modified query under a second set of processing conditions. One or more processors generate one or more second rules based, at least in part, on the degree of latency.

DETAILED DESCRIPTION

While there are known solutions to Common Information Model (CIM) queries, they are reliant on a known set of rules that do not change. Rules describe a set of methods to process the query. The inflexibility that results from these static rules can result in significant latency when a query is processed.

Embodiments of the present invention recognize that CIM queries can be improved by dynamically adapting the CIM request such that a more efficient access path is used. Embodiments of the present invention recognize that the following parameters can be used to select the more efficient access path: Common Information Model Object Manager (CIMOM) implementation, platform, size of CIM model, vendor provided access rules, and dynamically created access rules. Embodiments of the present invention recognize that dynamically created access rules can be generated based on CIM usage heuristics and measurements.

The present invention will now be described in detail with reference to the Figures.

Figure 1:
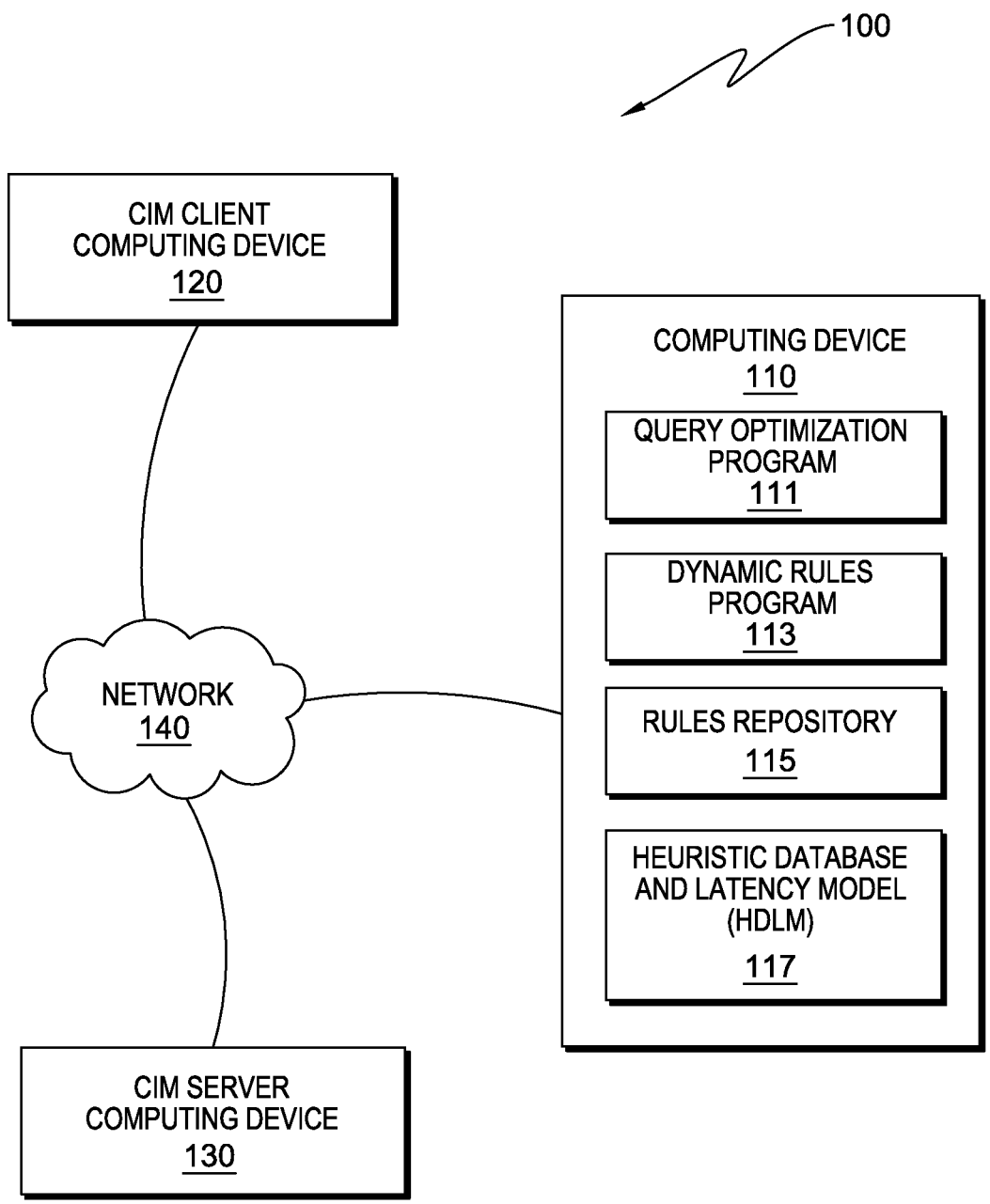
FIG. 1 is a functional block diagram illustrating a Common Information Model (CIM) environment, in accordance with an exemplary embodiment of the present invention.

FIG. 1 is a functional block diagram illustrating a Common Information Model (CIM) environment, generally designated 100, in accordance with one embodiment of the present invention. CIM environment 100 includes computing device 110, CIM client computing device 120 and CIM server computing device 130 connected over network 140. Computing device 110 includes query optimization program 111, dynamic rules program 113, rules repository 115, and heuristic database and latency model (HDLM) 117.

In various embodiments of the present invention, computing device 110, CIM client computing device 120 and CIM server computing device 130 respectively are computing devices that can be a standalone device, a server, a laptop computer, a tablet computer, a netbook computer, a personal computer (PC), or a desktop computer. In another embodiment, computing device 110, CIM client computing device 120 and CIM server computing device 130 represent a computing system utilizing clustered computers and components to act as a single pool of seamless resources. In general, computing device 110, CIM client computing device 120 and CIM server computing device 130 can be any computing device or a combination of devices with access to query optimization program 111, dynamic rules program 113, rules repository 115, and HDLM 117, and is capable of executing query optimization program 111 and dynamic rules program 113. Computing device 110, CIM client computing device 120 and CIM server computing device 130 may respectively include internal and external hardware components, as depicted and described in further detail with respect to FIG. 7.

In this embodiment, query optimization program 111, dynamic rules program 113, rules repository 115, and HDLM 117 are stored on computing device 110. However, in other embodiments, query optimization program 111, dynamic rules program 113, rules repository 115, and HDLM 117 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between computing device 110, CIM client computing device 120 and CIM server computing device 130, query optimization program 111, dynamic rules program 113, rules repository 115, and HDLM 117, in accordance with a desired embodiment of the present invention.

In this embodiment, computing device 110 is a proxy computing device that facilitates query processing between CIM client computing device 120 and CIM server computing device 130.

In this embodiment, query optimization program 111 receives queries from CIM client computing device 120. Query optimization program 111 accesses rules repository 115 and uses those rules to modify the received query to improve the efficiency of the processing of the query. In general, the more efficiently a query is processed, the faster a result for that query is produced. As such, query optimization program 111 modifies queries such that the time required to generate a result is reduced, hence improving the efficiency of the processing of the query. It is to be understood that the use of the words "optimizer" and "optimization" in proper names herein refers to an ability to cause an improvement in CIM processing, which may not be absolutely optimal in all interpretations or embodiments, since there is often a tradeoff for a given improvement. For example, one parameter is optimized while another parameter is exacerbated. As such the names "query optimization program 111" or "CIM query optimizer" are in reference to programs or program elements that have the ability to cause an improvement in at least one aspect of the processing of CIM queries.

In this embodiment, dynamic rules program 113 accesses rules repository 115 and modifies the rules stored therein using information included as part of HDLM 117. The modified rules are then included as part of rules repository 115. Alternatively, dynamic rules program 113 can generate new rules based, at least in part, on the information included as part of HDLM 117. The generated rules address various attributes and existing elements of the CIM such as CIMOM implementation, platforms included by the CIM, size of the CIM model, and vendor provided access rules.

In this embodiment, rules repository 115 is a set of access rules that are applied during the processing of a CIM query. These rules provide functionality for the processing of CIM queries using many elements included in the CIM (see the discussion of CIM schema below for further details). Rules repository 115 includes two types of access rules. The first type of access rules are original rules that are static. The second type of access rules are dynamic rules that can be adapted to conditions experienced during the processing of CIM requests. Dynamic rules are generated by dynamic rules program 113. Original rules are, usually, created by the developer or vendor of a CIM resource or object. The original rules can include rules that address the CIM Infrastructure Specification, which defines the architecture and concepts of CIM. A CIM Infrastructure Specification typically includes a language by which the CIM schema (including any extension schema) is defined, and a method for mapping CIM to other information models, such as Simple Network Management Protocol (SNMP).

The original rules typically include rules that address the CIM schema. A CIM schema is a conceptual schema which defines the specific set of objects and relationships between objects that represent a common base for the managed elements in an IT environment. The CIM Schema, in general, includes the elements in an information technology (IT) environment. An IT environment is the application of computers and telecommunications equipment, for example computer systems, operating systems, networks, middleware, services and storage, to store, retrieve, transmit and manipulate data. The CIM schema defines a common basis for representing these managed elements. Since many managed elements have product and vendor specific behavior, the CIM Schema is extensible in order to allow the producers of these elements to represent the respective specific features of those elements together with the common base functionality defined in the CIM Schema.

In this embodiment, HDLM 117 includes data from a heuristic database and a latency model for the CIM. A heuristic function, or simply a heuristic, is a function that ranks alternatives in search algorithms at each branching step based on available information to decide which branch to follow. For example, for shortest path problems, a heuristic is a function, $h(n)$ defined on the nodes of a search tree, which estimates the cost of the cheapest path from the starting node to the goal node. In many IT scenarios, the cost of a path can be in terms of latency of that path or an amount of resources required to use that path. Heuristics are used by informed search algorithms, such as greedy best-first search and A*, to choose the best node to explore. A greedy best-first search chooses the node that has the lowest value for the heuristic function. An A* search expands nodes that have the lowest value for $g(n)+h(n)$, where $g(n)$ is the (exact) cost of the path from the initial state or starting point to the current node. If $h(n)$ is admissible, i.e., if $h(n)$ never overestimates the costs of reaching the goal, then A* will always find an optimal solution. In general, the heuristics included in HDLM 117 are configured for ranking pathways to determine a pathway that provides the least latency for processing a CIM query relative to the other ranked pathways.

In this embodiment, a latency model is a model that represents the degree of latency of the various access pathways that can be or have been used to retrieve a result of a CIM query. The latency of a given access pathway can be attributed to several factors, such as network congestion, network traffic, distance between computing systems, and computer storage capacities, etc. In general latency is the time taken to process the query, which may include interruptions and delays in the completion of the processing.

Figure 2:
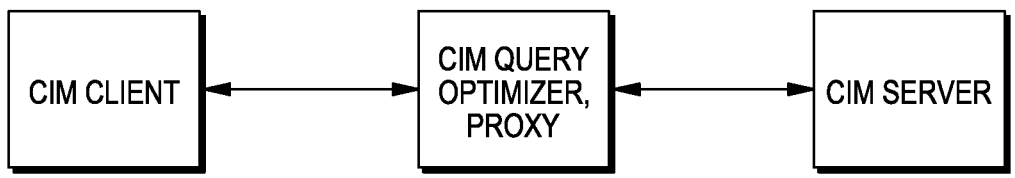
FIG. 2 illustrates the CIM query optimizer that is configured to function with a proxy computing device, in accordance with an exemplary embodiment of the present invention.
Figure 3:
FIG. 3 illustrates a CIM query optimizer that is configured to function as a plug-in for a CIM server, in accordance with an exemplary embodiment of the present invention.
Figure 4:
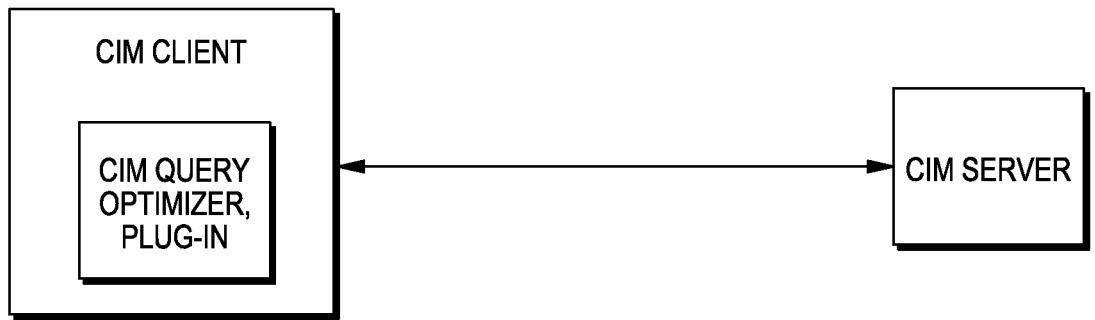
FIG. 4 illustrates a CIM query optimizer that is configured to function as a plug-in for a CIM client, in accordance with an exemplary embodiment of the present invention.

FIGS. 2-4 are block diagrams illustrating possible arrangements of a CIM query optimizer, a CIM client and a CIM server. A CIM query optimizer includes some or all of query optimization program 111, dynamic rules program 113, rules repository 115, and HDLM 117, in accordance with a desired embodiment of the present invention. The CIM query optimizer can be, in some embodiments, configured to function with a proxy computing device, such as computing device 110 as shown in FIG. 1. The CIM client can be seen as representing a computing device that generates a CIM query, such as CIM client computing device 120. The CIM server can be seen as representing a query processing computer that generates a result for a CIM query, such as CIM server computing device 130.

FIG. 2 illustrates a CIM query optimizer that is configured to function with a proxy computing device. In this configuration the CIM client and the CIM server may be unaware that CIM query optimizer exists. In such an embodiment, CIM query optimizer can intercept queries being issued by the CIM client, and modify those queries using query optimization program 111, dynamic rules program 113, rules repository 115, and HDLM 117, in accordance with a desired embodiment of the present invention. The modified queries are then passed to the CIM server for processing and the result of the query processing is returned to the CIM client. Such a configuration may be optimal in a scenario where an existing system includes multiple CIM clients and the network performance can benefit from further optimization. Such a configuration also requires little or no modification to the existing CIM client(s) and CIM server(s), which can be useful where backward compatibility issues exist.

FIG. 3 illustrates a CIM query optimizer that is configured to function as a plug-in for a CIM server. Such an embodiment may be of benefit when creating new CIM servers, as access performance can be improved. In such embodiments, the CIM server receives queries from CIM client(s) and passes them to the CIM query optimizer. In such an embodiment, CIM query optimizer modifies those queries using query optimization program 111, dynamic rules program 113, rules repository 115, and HDLM 117, in accordance with a desired embodiment of the present invention. The modified queries are then passed to the CIM server for processing and the result of the query processing is returned to the CIM client.

FIG. 4 illustrates a CIM query optimizer that is configured to function as a plug-in for a CIM client. Such an embodiment may be of benefit when there are new CIM clients. In such a scenario, access performance can be improved using recently created or updated client-specific rules, as a specific set of dynamically improved rules can be generated. In such embodiments, the CIM client generate queries and pass them to the CIM query optimizer. In such an embodiment, CIM query optimizer modifies those queries using query optimization program 111, dynamic rules program 113, rules repository 115, and HDLM 117, in accordance with a desired embodiment of the present invention. The modified queries are then passed to the CIM server for processing and the result of the query processing is returned to the CIM client.

Figure 5:
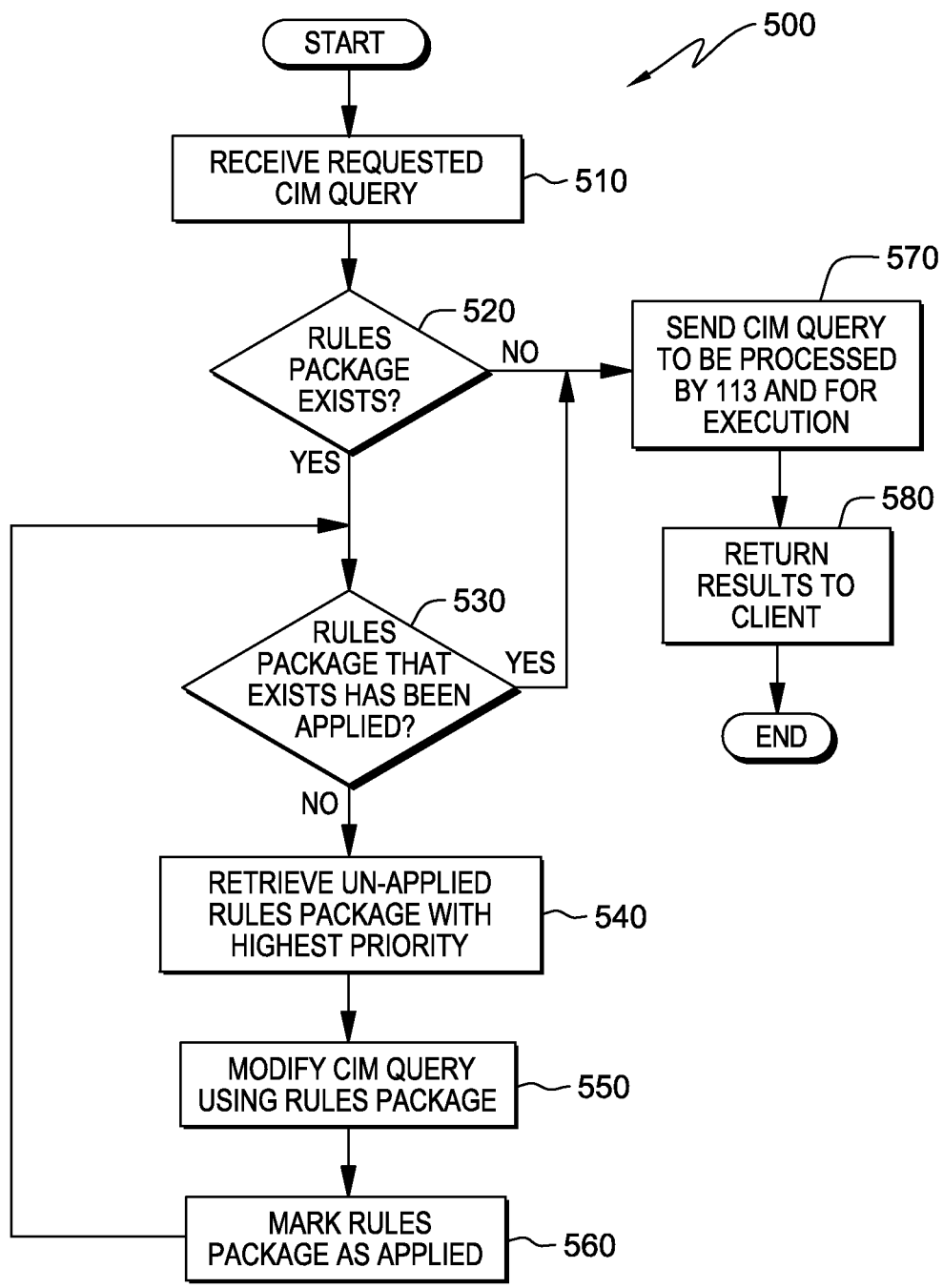
FIG. 5 is a flowchart depicting the operational processes of a query optimization program, on a computing device within the environment of FIG. 1, in accordance with an exemplary embodiment of the present invention.

FIG. 5 is a flowchart, 500, depicting the operational processes of query optimization program 111, on computing device 110 within the environment of FIG. 1, in accordance with an exemplary embodiment of the present invention.

In process 510, query optimization program 111 receives a requested CIM query. In many instances, such a request is from a client, such as CIM client computing device 120. In decision process 520, query optimization program 111 determines whether a rules package exists that can be applied to the CIM query. Query optimization program 111 accesses rules repository 115 and determines whether there are any rules, or sets of rules, that can be applied or should be applied to the CIM query.

Rules that can be applied or should be applied to the query are rules that are needed to process the query or will optimize the processing of the CIM query. In general, certain rules need to be applied in order to process the query, as such these rules can be and should be applied. However, other rules are optional, i.e., they can be applied but their application is optional, i.e., even though they could be applied, certain situations dictate that they should not be applied. These optional rules are often only applied if their application will optimize the processing of the CIM query. If query optimization program 111 determines that a rules package that can be applied to the requested CIM query does not exist (decision process 520, no branch), then query optimization program 111 proceeds to process 570. In general, if a particular query has not been processed before, then there is a chance that a rules package does not exist for that query. However, after a query is processed, dynamic rules program 113 will have generated a set of rules that can be applied to future instances of that query, or queries that are substantially related to that query, i.e., use some of the same pathways or include a request for some of the same data etc. If query optimization program 111 determines that a rules package does exist that can be applied to the requested CIM query (decision process 520, yes branch), then query optimization program 111 proceeds to decision process 530.

In decision process 530, query optimization program 111 determines whether the rules package has been applied to the requested CIM query, i.e., whether the rules package that should be applied has been applied to the requested CIM query. It should be noted that, in some cases, there may be multiple rules packages that should be applied. In some situations or embodiments, only certain rules packages should be applied. For example, the rules packages are ranked and only the highest ranked rules package that can be applied should be applied. In another example, rules package A includes a rule that conflicts with a rule in rule package B and both rules packages can be applied. In such a case query optimization program 111 would include logic, such as additional rules included in rules repository 115, to determine which package is to be applied. In general, query optimization program 111 compares the query request to a set of one or more rules packages, included in rules repository 115, to determine whether the rules that can and should be applied have been applied to the requested CIM query. If query optimization program 111 determines that the rules package, which may be more than one rules package, has been applied to the requested CIM query (decision process 530, yes branch), then then query optimization program 111 proceeds to process 570. If query optimization program 111 determines that the rules package has not been applied to the requested CIM query (decision process 530, no branch), then then query optimization program 111 proceeds to process 540.

In process 540, query optimization program 111 retrieves an un-applied rules package with the highest priority from rules repository 115. Query optimization program 111 accesses the heuristics included in HDLM 117 and applies them to determine which un-applied rules package has the highest priority. In general, the rules package that has the highest priority is the one which will provide the lowest latency with the best efficiency and will generate the result to the CIM query. The generation of a rules package that provides the lowest latency with the best efficiency and will generate the result to the CIM query, i.e., the rules that should be applied to the requested CIM query, is explained in further detail in the discussion of FIG. 6.

In process 550, query optimization program 111 modifies the requested CIM query with the retrieved un-applied rules package. Query optimization program 111 uses the retrieved rules package to modify the requested CIM query such that the processing of that CIM query is improved, i.e., will be processed as quickly and as efficiently as possible given the processing conditions, e.g., environmental factors that the heuristics are based on. In process 560, query optimization program 111 marks the rules package as applied and then returns to decision process 530.

In process 570, query optimization program 111 sends the CIM query for processing by dynamic rules program 113 and for execution by CIM server computing device 130. In some cases, the CIM query was not modified, such as in cases in which no rules package exists that can be applied to the requested query (decision process 520, no branch). In such a situation, the CIM query that is executed by a CIM server, such as CIM server computing device 130, can be the same query that was received by query optimization program 111. In other cases, the CIM query was modified using the rules included in rules repository 115. As such, the CIM query that is sent to be executed is not the same as that which was received by query optimization program 111.

In process 580, query optimization program 111 returns the results of the executed query to the client, e.g., CIM server computing device 130 returns the results of the executed query to query optimization program 111, which passes them to CIM client computing device 120.

Figure 6:
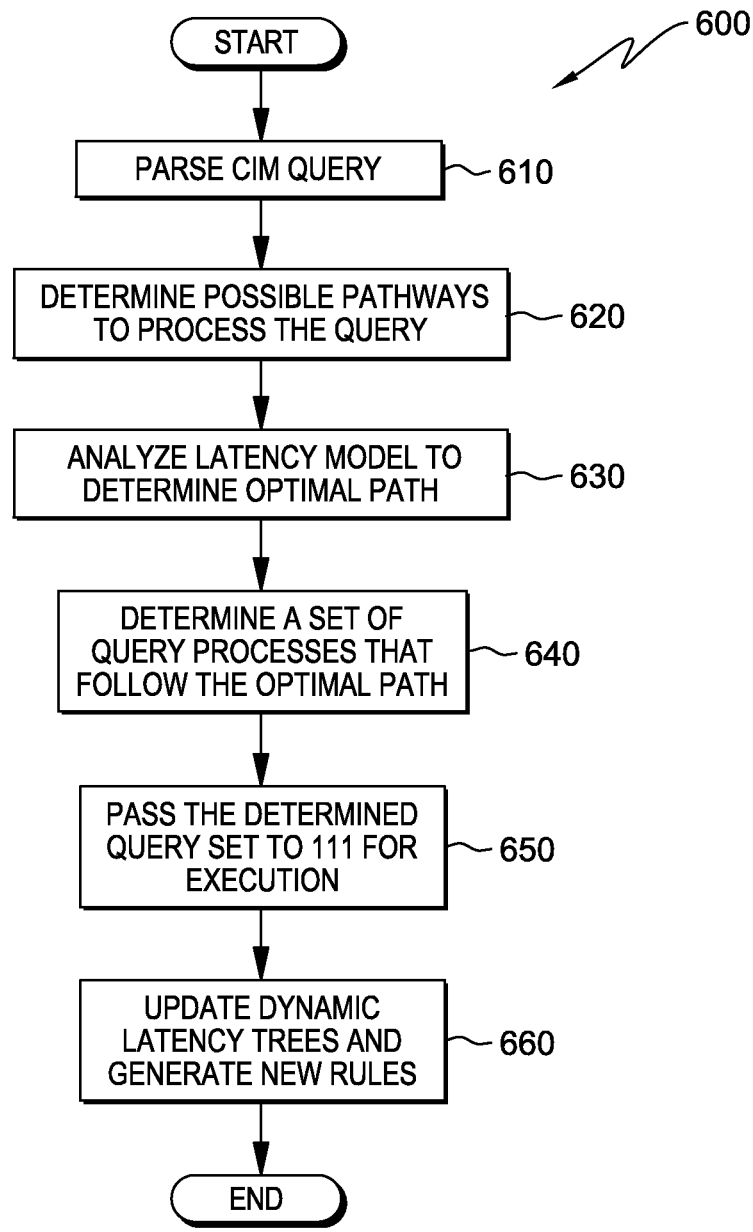
FIG. 6 is a flowchart depicting the operational processes of a dynamic rules program, on a computing device within the environment of FIG. 1, in accordance with an exemplary embodiment of the present invention.

FIG. 6 is a flowchart, 600, depicting the operational processes of dynamic rules program 113, on computing device 110 within the environment of FIG. 1, in accordance with an exemplary embodiment of the present invention.

In process 610, dynamic rules program 113 parses the requested CIM query to identify an initial set of query processes, e.g., operational steps or functions, that will, when executed, yield the result to the query. In process 620, dynamic rules program 113 determines which possible pathways can be used to process the CIM query and generate the result, i.e., the answer to the query, based on the initial set of query processes.

In process 630, dynamic rules program 113 analyzes a latency model to identify an optimal pathway. Dynamic rules program 113 accesses and analyzes the latency model(s) included as part of HDLM 117, and compares them to the possible pathways that can be used to process the CIM query. The analysis identifies the optimal pathway to be used to process the CIM query to generate the result.

In process 640, dynamic rules program 113 determines a new set of query processes that follow the optimal path. In other words, dynamic rules program 113 identifies a sequence of query processes that will satisfy the CIM query, as originally submitted, to generate the result and that will follow the optimal pathway to generate that result.

In process 650, dynamic rules program 113 passes the new set of query processes to query optimization program 111 for execution by CIM server computer 130. In many instances, query optimization program 111 passes the new set of query processes that follow the optimal path to a CIM server, e.g., CIM server computing device 130, which then executes the new set of query processes. Alternatively, dynamic rules program 113 passes the new set of query processes to the CIM server.

In process 660, dynamic rules program 113 updates a set of dynamic latency trees and generates new rules based on latencies that are measured during the execution of the new set of query processes. The dynamic latency trees are included as part of HDLM 117 and are updated based on the results of the execution of the new set of query processes. This update includes actual, i.e., measured, latencies that were experienced during the execution of the new set of query processes. The new rules that are generated by dynamic rules program 113 are included as part of rules repository 115. The new rules take into account the actual latencies that were experienced during the execution of the new set of query processes. In some cases, this results in the creation of a rule that reinforces a previously existing rule. For example, an original rule could specify the use of pathway Y. Based on the actual latency, the new rule specifies the use of pathway Y followed by pathway Z. In other cases, this results in the creation of a rule that contradicts a previously existing rule. For example, an original rule could specify the use of pathway A. Based on the actual latency of pathway A, if the use pathway B will likely result in a lower latency, then the new rule specifies the use of pathway B. In some embodiments, statistical analysis and a variety of thresholds are applied to generate the new rules. This helps ensure that the new rules that are generated have the highest probability of being more efficient, i.e., having the lowest latency.

Figure 7:
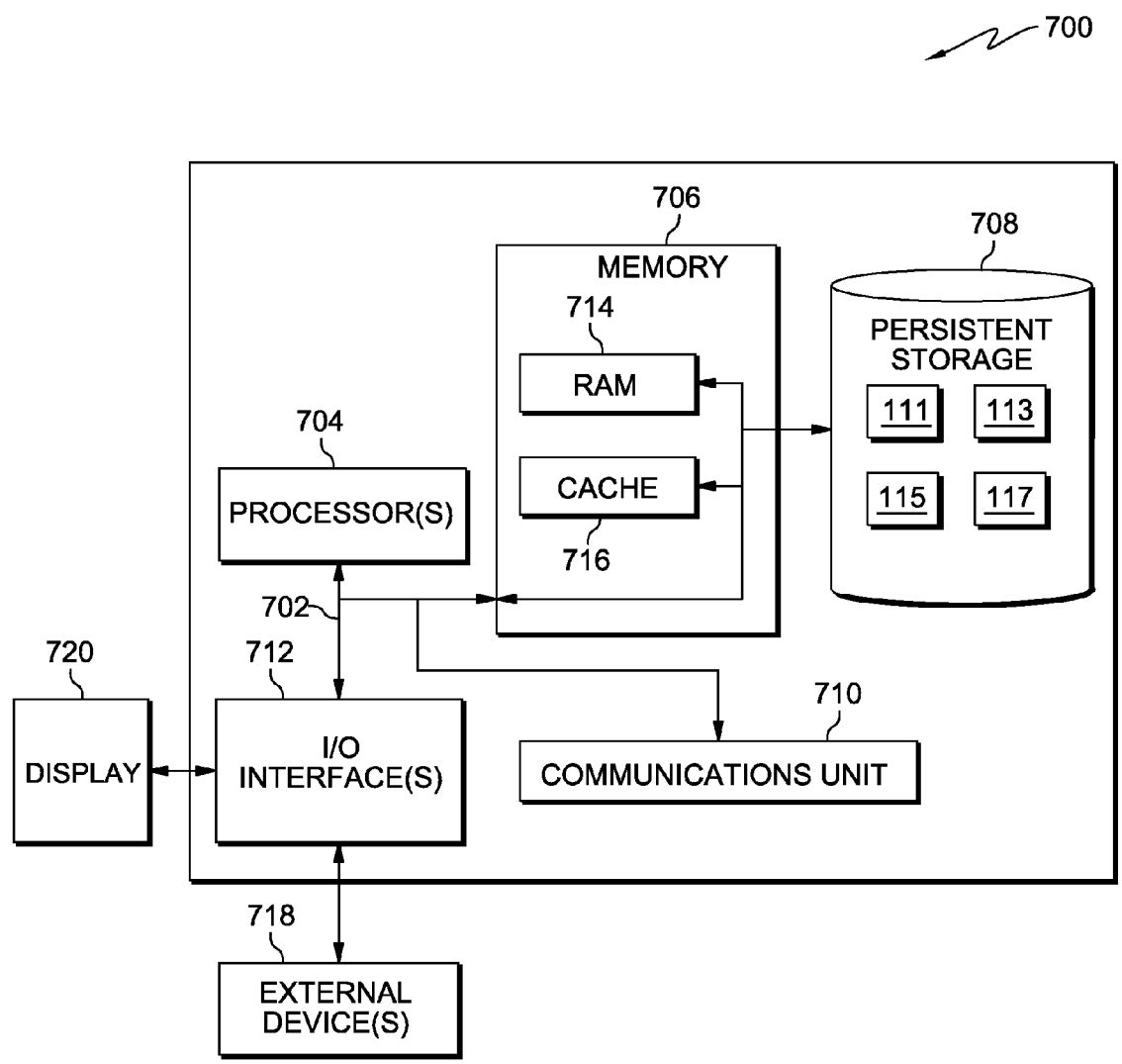
FIG. 7 depicts a block diagram of components of a computing device executing a query optimization program and dynamic rules program, in accordance with an exemplary embodiment of the present invention.

FIG. 7 depicts a block diagram of components of computing device 110 executing a query optimization program and a dynamic rules program, in accordance with an exemplary embodiment of the present invention. It is to be noted that FIG. 7 may also depict components of CIM client computing device 120 and CIM server computing device 130, which, depending on the embodiment, may also be the computing device executing query optimization program 111, in accordance with exemplary embodiments of the present invention.

In this embodiment, FIG. 7 depicts a block diagram, 700, of components of computing device 110, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 110 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Query optimization program 111, dynamic rules program 113, rules repository 115, and heuristic database and latency model (HDLM) 117 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 140. In these examples, communications unit 710 includes one or more network interface cards. Communications unit 710 may provide communications through the use of either or both physical and wireless communications links. Query optimization program 111, dynamic rules program 113, rules repository 115, and HDLM 117 may be downloaded to persistent storage 708 through communications unit 710.

I/O interface(s) 712 allows for input and output of data with other devices that may be connected to computing device 110. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., query optimization program 111, dynamic rules program 113, rules repository 115, and HDLM 117, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A computer program product for applying rules to queries, the computer program product comprising:
   a computer readable storage medium and program instructions stored on the computer readable storage medium, the program instructions comprising:
      program instructions to apply one or more first rules to a first query to generate a modified query such that processing of the modified query is optimized for a first set of processing conditions;
      program instructions to measure a degree of latency experienced during processing of the modified query under a second set of processing conditions;
      program instructions to generate one or more second rules based, at least in part, on the degree of latency;
      program instructions to update a set of latency trees that represent latencies measured during execution of a third set of query processes;
      program instructions to generate one or more modified rules based, at least in part, on the updated set of latency trees;
      program instructions to determine whether one or both of the first rules and the second rules are to be applied to a third query for data residing in a hierarchical structure;
      program instructions to respond to a determination that one or both of the first rules and the second rules are to be applied to the third query, by determining whether one or both of the first rules and the second rules have been applied to the third query; and
      program instructions to respond to a determination that one or both of the first rules and the second rules have not been applied to the third query, by applying one or both of the first rules and the second rules to modify the third query such that the third query is optimized for a third set of processing conditions.

2. The computer program product of claim 1, the program instructions further comprising:
   program instructions to identify a second query; and
   program instructions to apply the one or more second rules to the second query such that processing of the second query is optimized for the second set of processing conditions.

3. The computer program product of claim 1, the program instructions further comprising:
   program instructions to parse a received query to identify a first set of query processes that will, when executed, yield the result to the query; and
   program instructions to determine which possible pathways can be used to process the received query and generate a result based, at least in part, on the first set of query processes.

4. The computer program product of claim 3, the program instructions further comprising:
   program instructions to analyze a latency model to determine which pathways can be used to process the received query and which pathways can be used to generate the result, wherein such pathways are determined based, at least in part, on a predicted degree of latency produced by the analysis of the latency model.

5. The computer program product of claim 4, the program instructions further comprising:
   program instructions to determine a second set of query processes that follow the specific pathway and will generate, when executed, the same result as the first set of query processes.

6. A computer system for applying rules to queries, the computer system comprising:
   one or more computer processors;
   one or more computer readable storage media;
   program instructions stored on the computer readable storage media for execution by at least one of the one or more processors, the program instructions comprising:
      program instructions to apply one or more first rules to a first query to generate a modified query such that processing of the modified query is optimized for a first set of processing conditions;
      program instructions to measure a degree of latency experienced during processing of the modified query under a second set of processing conditions;
      program instructions to generate one or more second rules based, at least in part, on the degree of latency;
      program instructions to update a set of latency trees that represent latencies measured during execution of a third set of query processes;
      program instructions to generate one or more modified rules based, at least in part, on the updated set of latency trees;
      program instructions to determine whether one or both of the first rules and the second rules are to be applied to a third query for data residing in a hierarchical structure;
      program instructions to respond to a determination that one or both of the first rules and the second rules are to be applied to the third query, by determining whether one or both of the first rules and the second rules have been applied to the third query; and
      program instructions to respond to a determination that one or both of the first rules and the second rules have not been applied to the third query, by applying one or both of the first rules and the second rules to modify the third query such that the third query is optimized for a third set of processing conditions.

7. The computer system of claim 6, the program instructions further comprising:
  program instructions to identify a second query; and
  program instructions to apply the one or more second rules to the second query such that processing of the second query is optimized for the second set of processing conditions.

8. The computer system of claim 6, the program instructions further comprising:
  program instructions to parse a received query to identify a first set of query processes that will, when executed, yield the result to the query; and
  program instructions to determine which possible pathways can be used to process the received query and generate a result based, at least in part, on the first set of query processes.

9. The computer system of claim 8, the program instructions further comprising:
  program instructions to analyze a latency model to determine which pathways can be used to process the received query and which pathways can be used to generate the result, wherein such pathways are determined based, at least in part, on a predicted degree of latency produced by the analysis of the latency model.

10. The computer system of claim 9, the program instructions further comprising:
  program instructions to determine a second set of query processes that follow the specific pathway and will generate, when executed, the same result as the first set of query processes.

\* \* \* \* \*